United States Patent [19]
Paul et al.

[11] Patent Number: 5,165,238
[45] Date of Patent: Nov. 24, 1992

[54] CONTINUOUS EXTERNAL HEAT ENGINE

[76] Inventors: Marius A. Paul; Ana Paul, both of 969 La Paz Rd., Placentia, Calif. 92670

[21] Appl. No.: 704,293
[22] Filed: May 21, 1991
[51] Int. Cl.5 .............................. F02C 1/04
[52] U.S. Cl. ................... 60/682; 418/61.2; 418/159
[58] Field of Search ................ 60/650, 682; 418/61.2, 418/159

[56] References Cited

U.S. PATENT DOCUMENTS

| | | | |
|---|---|---|---|
| 2,991,930 | 7/1961 | Lindner | 418/159 |
| 3,446,190 | 5/1969 | Bensinger et al. | |
| 3,628,899 | 12/1971 | George | 418/61.2 |
| 3,762,376 | 10/1972 | Eberle et al. | |
| 3,844,256 | 10/1974 | Ishikawa et al. | |
| 3,886,911 | 6/1975 | Glatt | |
| 4,389,172 | 6/1983 | Griffith | 418/61.2 |
| 4,483,821 | 7/1989 | Paul et al. | 60/605.1 |

Primary Examiner—Allen M. Ostrager
Attorney, Agent, or Firm—Bielen, Peterson & Lampe

[57] ABSTRACT

A thermal engine utilizing a positive displacement rotary expander and preferably a positive displacement rotary compressor in conjunction with an external substantially steady-state thermal source, such as a continuous fuel combustor, the external source heating a high pressure gas that is directed from the thermal source to the rotary expander wherein the gases expand driving a rotor in the positive displacement rotary engine before discharge.

14 Claims, 6 Drawing Sheets

CONTINUOUS EXTERNAL HEAT ENGINE

BACKGROUND OF THE INVENTION

This invention relates to a new category of thermal engine in which an external source of thermal energy supplies the working medium for a thermal cycle. The thermal cycle can be an open cycle in which the medium is exhausted and discharged from the engine or a closed cycle. In general, the state-of-the-art of external combustion engines, including rotary engines, is characterized by an intermittent cyclic heat release by periodic combustion within high-pressure chambers. Combustion is generally either spark ignited in the case of gasoline engines, or auto ignited in the case of high-pressured diesel engines in which fuel is periodically injected into the combustion chambers. These engines, whether utilizing recipical pistons or rotary pistons have certain limitations in providing efficient combustion and low pollution emission. Because of the periodic nature of combustion there are severe pressure limitations on the structure of the engine, and low power density and low thermal efficiency that results from the inability to have full and complete combustion within the extremely brief combustion phase of the operating cycle. Furthermore, fuel quality must be closely controlled to insure consistent operation. The use of high octane and cetane fuels to inhibit premature detonation and control the burning process in modern engines contributes to the release of exotic pollution emissions.

In addition, internal combustion engines that are of a gas turbine design are efficiently operable only within a narrow range of rotations and loads. Inefficiently high fuel consumptions must be maintained under partial load conditions to prevent a reduction in temperature and driving pressure with a resulting reduction in the level of rotation. This results in a drop of the pressure ratio and effects a substantial loss in efficiency. Furthermore, the very structure of a gas turbine engine is complex and expensive to fabricate, utilizing exotic materials and assemblies. This limits the use of such engines primarily to aircraft.

A primary object of this invention is to devise a engine that can utilize a relatively steady state, external thermal source to continuously generate a high-pressure, high-temperature motive gas to drive an engine and produce mechanical power for use in transportation or electrical energy production. Such an external heat engine can thereby utilize a variety of different sources of heat and grades of fuel to directly produce the motive gases. By the use of suitable heat exchange devices a variety of sources can heat a select motive gas to the temperatures and pressures necessary to endlessly supply the engine with its driving medium.

SUMMARY OF THE INVENTION

In its preferred embodiments the engine comprises a Wankel-type positive displacement, rotary engine that is an efficient means for producing a rotary output.

The design of the engine with a substantially steady-state external heat source enables the engine to be used with a variety of thermal generating means such as an external combustion chamber, waste heat exchangers, nuclear reactors, solar heat concentrators, or any type of thermal energy source that develops sufficient heat to be applied to an expandable gas that can be used as a driving or motive gas in a suitably designed rotary engine. The expandable gas if desired or required can be cycled in a closed system or, in the case of a simple combustion gas or ordinary air can be vented to the atmosphere. The principle advantage to this type of engine is that in combustion sources, the combustion can be closely controlled to maximize efficiency and minimize pollution, or, where the thermal source is other than that generated by a combustion process, nontraditional. Usually steady-state thermal sources that inherently do not contribute to air pollution can be effectively utilized to power the subject engine.

In the preferred embodiments of this invention, a Wankel-type, rotary-piston, expander is designed with a positive, variable-displacement rotary expander that enable close control of the operating conditions of the engine with relation to thermal input and mechanical output. Heretofore, continuous combustion engine or engines using a continuous thermal source are characteristically nonresponsive to the changes in output demands, resulting in overpowering and excess fuel consumption.

The engine is permitted to operate at maximum pressure of the nominal displacement value at all loads including part loads conserving the thermal efficiency, and, in the cases where fuel is utilized, resulting in a flat specific fuel consumption. The system is controlled by a central processor module which includes a system of sensors to sense operating conditions and optimize all parameters of rotation, load, pressure, temperature, and relative speed of rotary compression and expansion units.

The resulting system is ideal for use in hybrid vehicles where auxiliary power sources are combined to propel the vehicle or in power generation systems where continuous operation is desired with moderate fluxuations in load.

DESCRIPTION OF THE PREFERRED EMBODIMENTS

Figure 1:
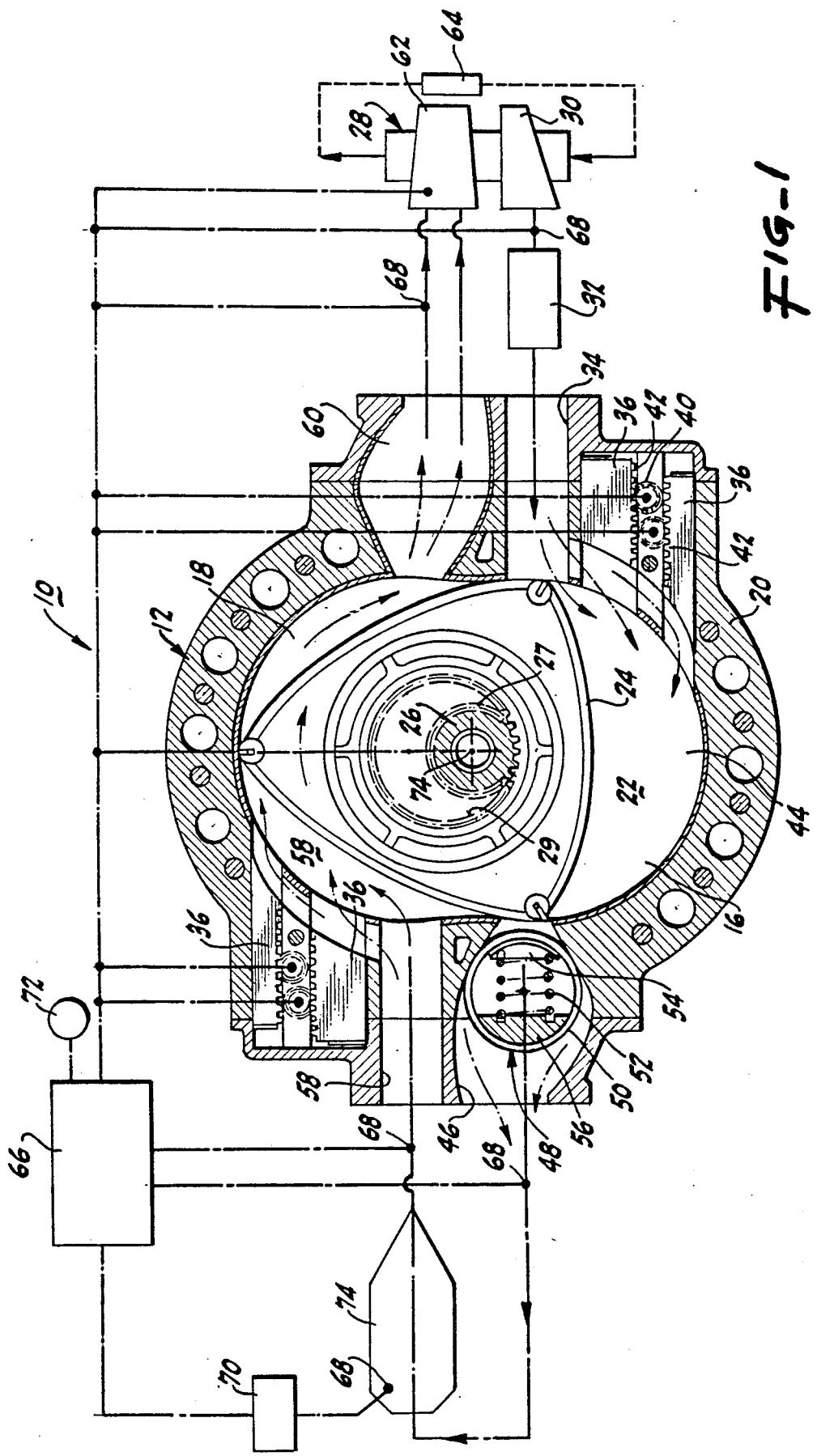
FIG. 1 is a schematic view, partially in cross-section, showing a single rotor unit with a combined expander and compressor cycle.
Figure 2:
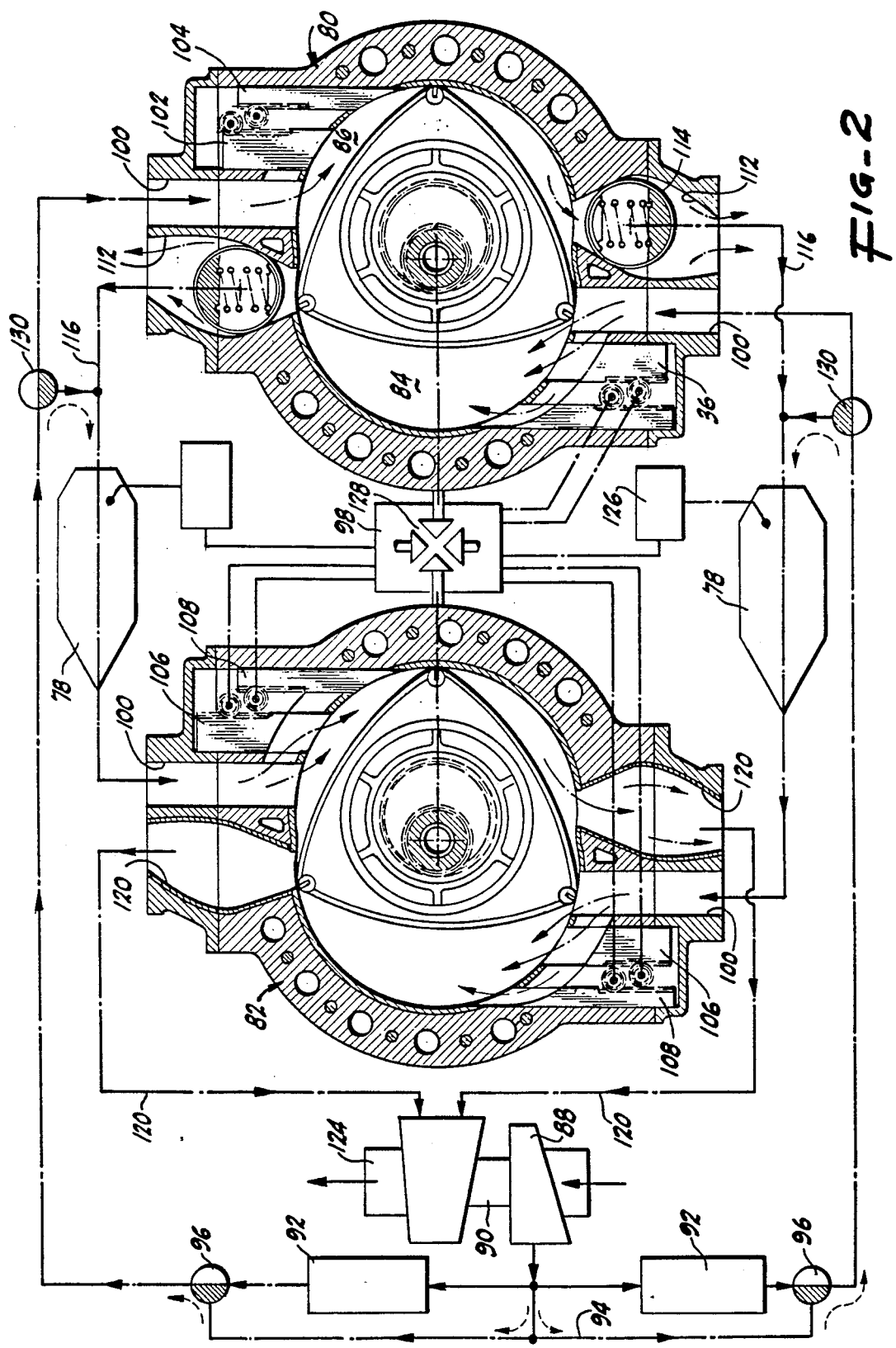
FIG. 2 is a schematic view, partially in cross-section, of a double rotor unit connected in tandem with one of the units comprising a duel compressor and the other unit comprising a duel expander.

Referring to FIGS. 1 and 2, an engine system having an external thermal source is shown. In the embodiments shown, the external thermal source is a continuous fuel combustor, however, it is to be understood that the system is operable with thermal sources that do not result in any combustion gases, such as geothermal, nuclear, and solar sources. As a variety of additional components are customerily utilized for the external thermal sources, the selected combustors are shown only schematically in order to adequately describe the focus of the invention.

The thermal engines of this invention utilize new configurations of variable-displacement, rotary engines in various combinations. The engines are optimized and controlled by a central processor which monitors the engine operating parameters and adjusts the engine controls to achieve a maximum, thermal-constant efficiency, with a minimum constant-flat-specific fuel or energy consumption. The central processor is of type that is being currently applied to internal combustion automotive engines and is described only generally herein.

Referring to FIG. 1, the external heat engine is designated generally by the reference numeral 10. The heat engine 10 utilizes a single Wankel-type rotary unit 12 in combination with an external, substantially steady-state, thermal source 14, which in the embodiment in FIG. 1 is a continuous fuel combustor. It is to be understood that the thermal source 14 can be any high temperature source of thermal energy that can be transferred to a gas stream for use as a motive medium for the rotary unit 12. In the preferred embodiment the heat engine 10 utilizes both a compressor and an expander in the form of a compressor side 16 and an expander side 18 of the rotary unit 12.

As shown in FIG. 1, the rotary unit 12 has an external housing 20 having an epitroichoidal chamber 22 and a triangular rotor 24 the rotor 24 rotates in the chamber 22 about a central shaft 26 having external gears 27 that engage the internal gears 29 of the rotor 24 in conventional fashion. The shaft 26 is rotatably mounted in the housing 20 and provides the output means for mechanical work. In the preferred embodiment, a turbocharger 28 receives an intake gas to a compressor section 30 where the gas, in this example, air, is compressed and passed through an intercooler 32 before entering the intake port 34 of the compressor side 16 of the rotary unit. The effective volume of the air that is compressed by the compression side 16 of the rotary unit 12 is determined by the position of displaceable control plugs 36 which are linearly displaced by electronically motored pinions 40 which engage racks 42 on each control plug to selectively and discretely advance or retract each plug and effectively alter the degree of bypass that air can take as it enters the compression side of the rotary unit. In this manner the staged change in the volumetric displacement can be deliberately effected by a controller. As the rotor 24 of the unit 12 advances with a defined charge and diminishes the volume of the compressor chamber 44 the air is compressed and eventually exits through outlet or exit port 46 upon exposure of the port and upon displacement of an automotive outlet valve 48. The outlet valve 48 protects the compression chamber 44 from back flow of exhausted gases. The outlet valve 48 is cylindrical in configuration with a shell 50 containing a compression spring 52. The spring operates against a stationary post 56 and against a seat 54 on the inside of the shell 50.

As shown schematically, the compressed gases enter a thermal source 14 which may be a combustor that contributes products of combustion to the gas stream, or may be a thermal source that only adds heat to the compressed gas. The heated gas then enters the expander through intake port 58 having adjustable control plugs 36 which are similar to the control plugs for the compressor chamber 22. The expander chamber 59 receives the motive gases, which force the rotor 24 to rotate as the chamber enlarges. As the rotor rotates the gases are permitted to pass through a gradually exposed exhaust port 60 where they are delivered to a turbine side 62 of the turbocharger 28. The cooled and expanded gases are then either exhausted to the atmosphere or collected in an expansion chamber 64 which allows the gases to reach substantially ambient conditions before being resupplied to the compression side 30 of the turbocharger 28.

A computer processor 66 monitors and controls, and has a series of pressure/temperature sensors 68 electronically connected to the processor 66 to sense operating pressures and temperatures in the system for regulating the relatively steady-state heat source 14 by a heat control device 70, if necessary, in response to a demand input sensor 72 and current output sensor 74. Similarly, in response to processed signals by the central processor 66 the control plugs 36 each can be variably regulated to adjust the operating conditions of the unit in accordance with load and demand.

With reference to FIG. 2, a similar arrangement of this invention is provided with an external heat source that is a continuous combustor. Referring to FIG. 2, the heat engine 10 is constructed with two rotary units 80 and 82, here shown connected to a thermal source 14, shown as two combustor units 78 for schematic clarity. It is to be understood that the thermal source can be a single source of thermal energy that is to be transferred to the working gas in a manner similar to that described with reference to FIG. 1. In the FIG. 2 arrangement, one rotary unit 80 is dedicated to gas compression and the other unit 82 is dedicated to gas expansion. The gas compression unit 80 has a housing 83 with a bifurcated compression chamber 84 and 86 such that each side of the rotary unit compresses a stream of gas, preferably air, that is delivered from the compression side 88 of a turbocharger 90 through supercoolers 92 provided with bypass passages 94 regulated by bypass valves 96.

As in the previous embodiment, a central processor 98 has a series of sensors (not shown) to sense the operating conditions of the engine in order to optimize and regulate the engine operation as described with reference to FIG. 1. The central processor 98 operates the intake control plugs 102, 104 associated with each side of the compressor unit 80 and the intake control plugs 106, 108 of the expander.

Figure 4:
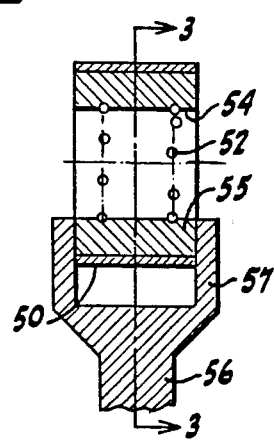
FIG. 4 is a cross-sectional view taken on the lines 3—3 of FIG. 3.
Figure 3:
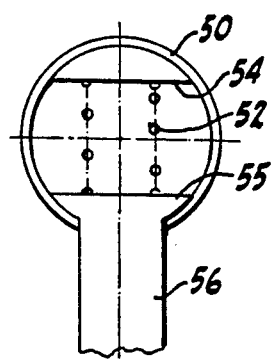
FIG. 3 is an enlarged end view of the automotive valve used in the engine of FIG. 1 and 2.

The intake control plugs 102, 104 effectively alter the size of the intake ports 100 and the volumetric displacement of the compressor and are adjusted according to load and demand. As the compressor rotor 110 exposes the exit ports 112 of the compressor unit 80, the compressed motive gas actuates the automotive valves 114 and is conducted via conducts 116 to the combustor units 78. The motive gas is heated and continues to the intake ports 118 of the expander unit 82. The automotive valves 114 are shown in detail in FIGS. 3 and 4. The valve similar to that shown with reference to FIG. 1 having a cylindrical shell 50 having a compression spring 52 with a seat 54 fixed to the shell 50 for one end of the spring and a seat 55 on a post 56 having a fork 57 to allow displacement of the valve. The valve 114 is held in place in the exit ports by the spring until displaced by force of the compressed motive gas. The valve prevents any backflow into the compressor.

In a manner similar to that described with respect to the embodiment of FIG. 1, the control plugs 106, 108 of the expander 82, enable variance of the volumetric displacement of the unit. The motive gases exit to the exit ports 120 before being conducted by conduits 122 to the turbine side 124 of the turbocompressor.

The central processor 98 monitors and controls the operation of the engine including a modulator 126 for the heat source and a variable transmission and clutch unit 128 for either varying the rotational ratio of the interconnected units 80, 82 or separating the units and bypassing the motive gas through flow control valves 130.

To improve the effective operation of the rotary units at maximum pressure for the construction and materials selected for a particular operating environment, improved apex seals are provided.

Figure 5:
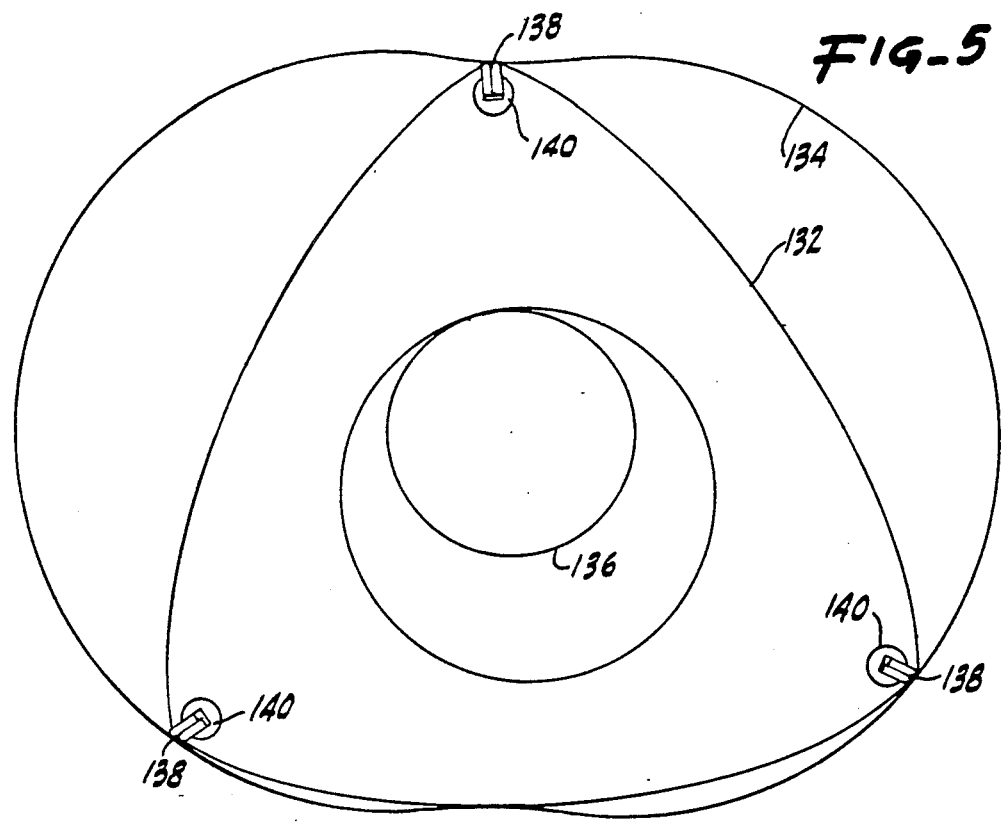
FIG. 5 is a diagrammatic view of a rotary piston and epitrochoidal chamber with apex seals.
Figure 10:
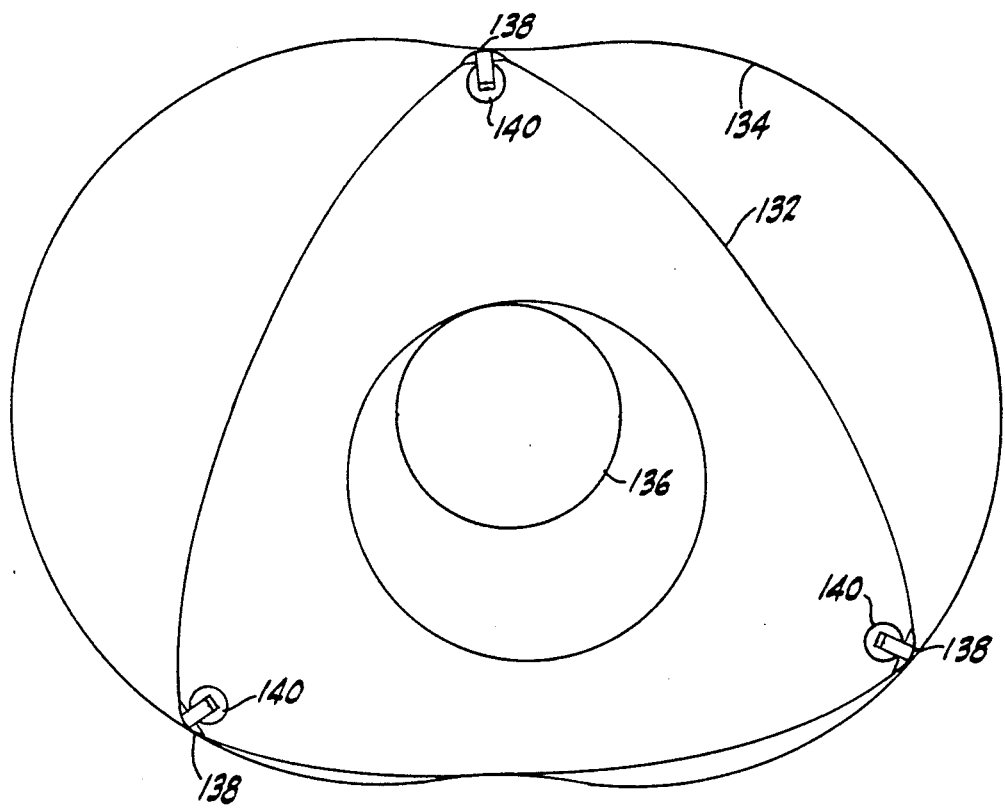
FIG. 10 is an enlarged alternate view of a rotary piston and epitrochoidal chamber with apex seals.
Figure 14:
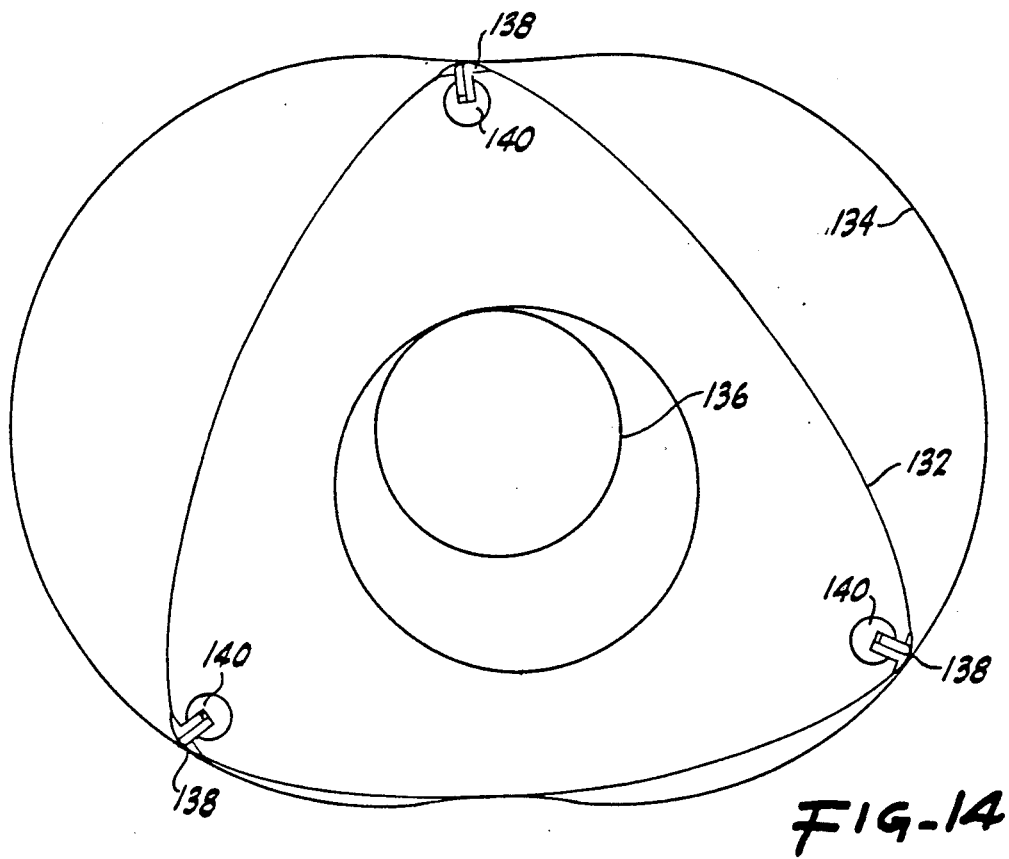
FIG. 14 is a diagrammatic view of an alternate embodiment rotary piston and epitrochoidal chamber with apex seals.
Figure 17:
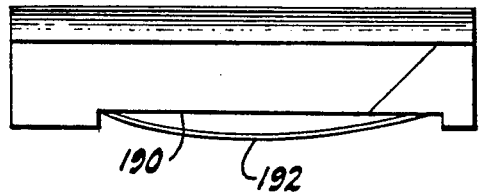
FIG. 17 is a side elevational view of the other seal member.

Referring to FIGS. 5, 10 and 14, a rotor 132 mounted eccentrically in an epitrochoidal chamber 134 in geared engagement with a rotatable shaft 136 has apex seals 138 in retainers 140 at the apex of the triangularly shaped rotor. These embodiments of the apex seals are described for alternative use in the engines of FIG. 1 and FIG. 2.

Referring to FIGS., 6–9 a double seal with a first member 142 and a second member 144 are shown with an arcuate top surface 146 and a recessed bottom 148 for installation of a leaf spring 150 to urge the seals toward the chamber during operation.

Figure 9:
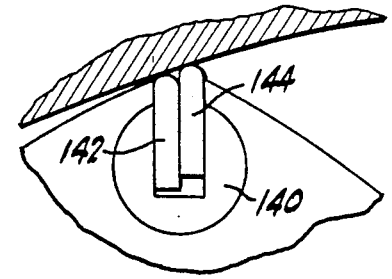
FIG. 9 is an enlarged end view of the seals in an inset.
Figure 8:
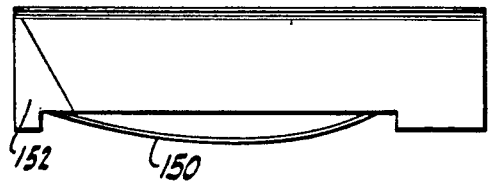
FIG. 8 is a side elevation of the other seal member.
Figure 7:
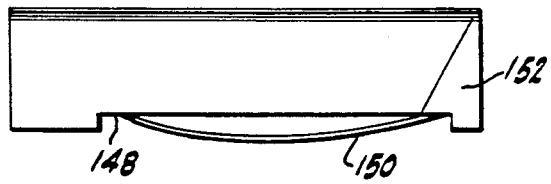
FIG. 7 is a side elevational view of one of the seal members.
Figure 6:
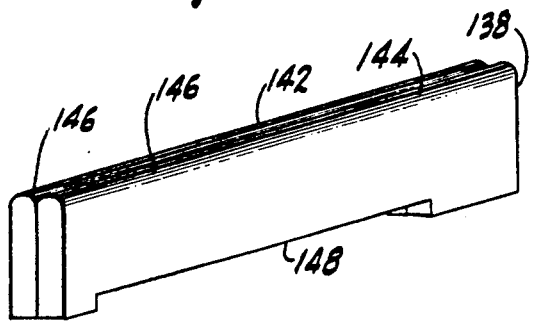
FIG. 6 is a prespective view of the apex seals.

The double floating seal members 142, 144 can adjust to the chamber independently as shown in FIG. 9. The seals trap a bead of oil between seal members to further improve the double sealing action of the displaceable members. A wedge-shaped end segment 152 at remote opposed ends of each member 142, 144 together with the spring action produces an axial/radial expansion effect to aide in sealing the ends of the apex seal members as well as the gliding tops.

Figure 12:
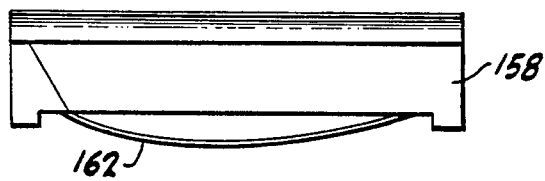
FIG. 12 is a side elevational view of the end seal of FIG. 11.
Figure 13:
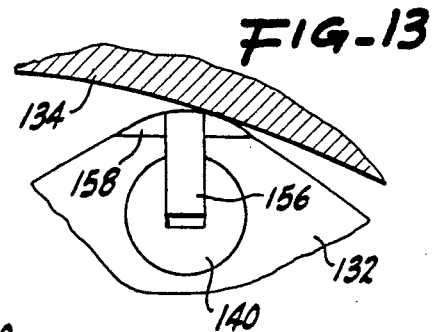
FIG. 13 is an enlarged end view of the apex seal installed in an inset.
Figure 11:
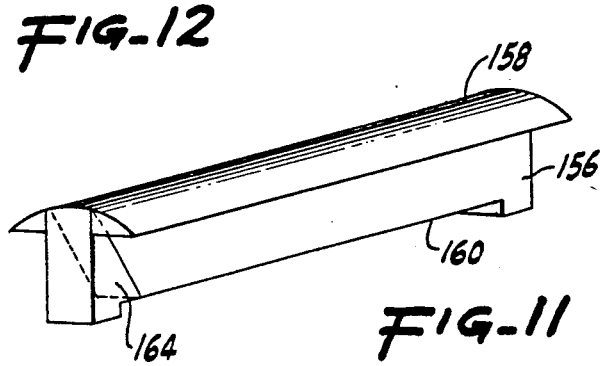
FIG. 11 is a prespective view of one of the end seals.

Referring to FIGS. 11–13, a single end seal 156 has an enlarged, flatter, curved top edge 158 to promote increased contact on the relatively flat chamber wall. The seal is designed to encourage full surface contact gliding on an air or oil cushion. The seal 156 has a central body 158 with a recess 160 for installation of a leaf spring 162 to urge the seal against the wall when installed in the inset 140.

At least one end 164 of the seal 156 has the diagonal cut to enable the sections to impart a wedge action.

Referring to FIGS. 15–18 the seal shown combines the advantages of the previously described seals and is constructed with matched seal members 166, 168 with a central segment 170, 172 having arcuate tops 174, 176 with tapered overlap edges 178, 180.

Figure 18:
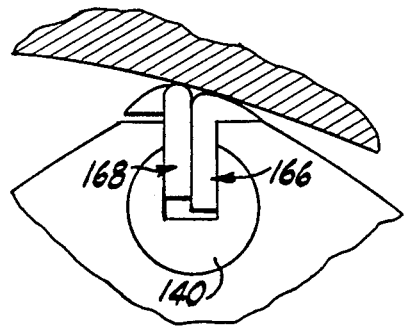
FIG. 18 is an enlarged end view of the combined seal in an inset.
Figure 16:
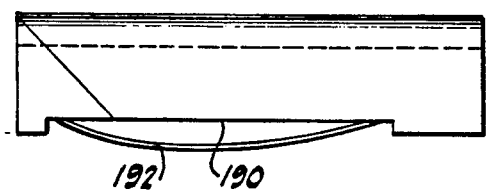
FIG. 16 is a side elevational view of one of the seal members.
Figure 15:
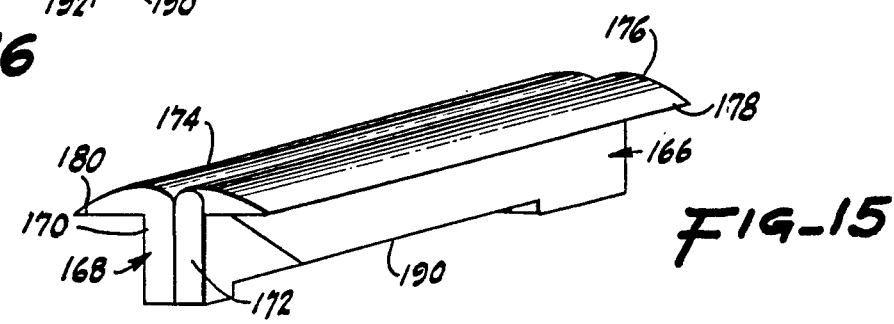
FIG. 15 is a perspective view of the combined apex seal.

An inset 190 in the bottom allows for installation of leaf springs 192 to permit independent displacement as shown in FIG. 18. As in the first embodiment, oil is trapped between seals and is carried as a further seal between sections. As in the second embodiment the tapered top permits a hydro-gaseous gliding conducive to acceptable operation at higher pressure and speeds.

The larger area of the seals distributes the forces and disperses the wear, providing a longer life for this important component in the rotary machines.

Figure 19:
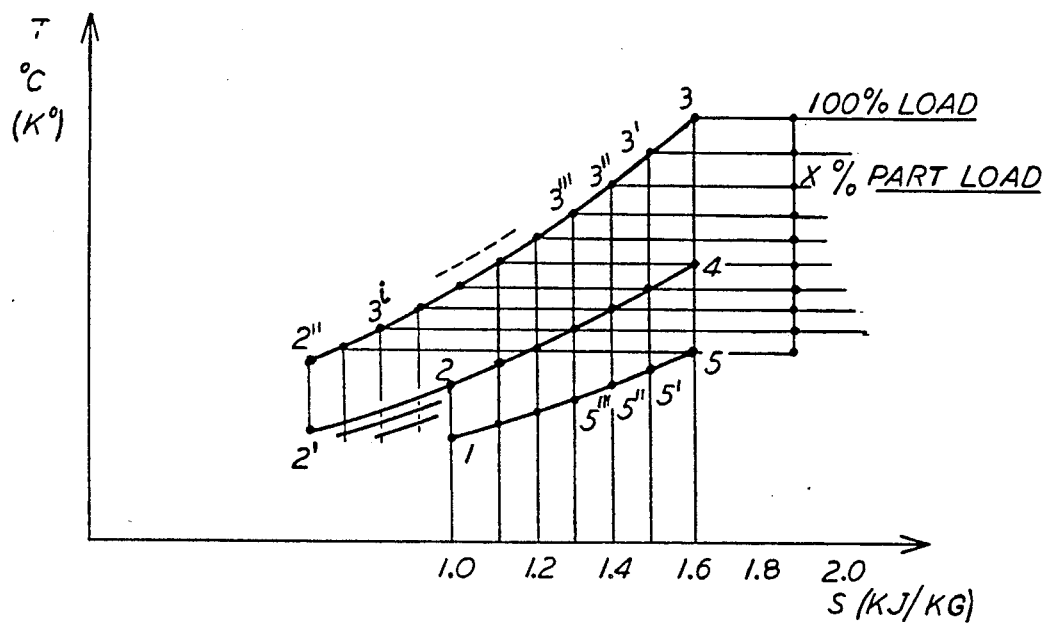
FIG. 19 is a diagrammatic view of TS-PV diagrams.
Figure 19:
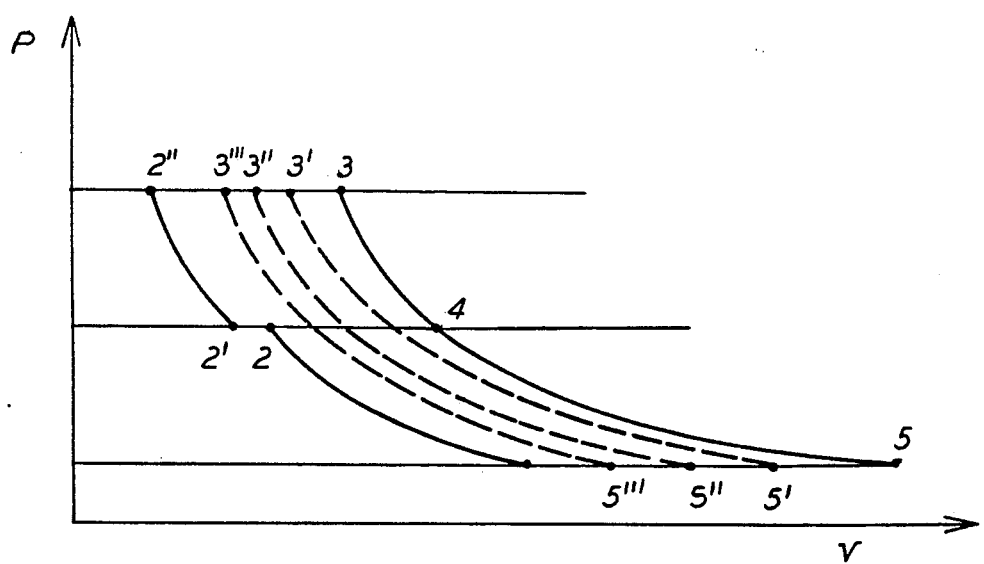

Referring to FIG. 19, a diagrammatic illustrations of TS and PV are shown to illustrate the thermodynamic operating conditions at discrete levels of partial load.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A thermal engine having a substantially steady-state, external thermal source for heating a motive gas comprising:
   a positive displacement, rotary engine component having an engine housing forming an internal epitrochoidal chamber;
   a piston rotor having an internal gear, the rotor being eccentrically contained in the epitrochoidal chamber and rotatable therein wherein the rotor and chamber are configured to effectively divide the chamber into two sides, each side having an intake port and an exit port;
   a drive shaft rotationally mounted to the housing having means for mechanically engaging the internal gear of the eccentric rotor wherein rotation of the rotor in the housing rotates the drive shaft;
   means mounted in the housing for selectively varying the size of the intake ports for altering the volume of the motive gas subject to the expansion or compression in each side of the epitrochoidal chamber of the rotor; and
   conduit means for directing the motive gas to the external thermal source wherein the gas is thermally heated, and from the thermal source to at least one of the intake ports on one side, comprising an expander side of the housing chamber, wherein the motive gas is expanded, rotating the rotor before exiting from the exit port.

2. The thermal engine of claim 1, the rotary engine component having further, conduit means for directing a motive gas to the intake port of the other side, comprising a compressor side of the housing chamber, wherein the motive gas is compressed by the rotating rotor and ejected from the exit port on the compression side of the housing chamber.

3. The thermal engine of claim 2, the rotary engine component having further, one-way valve means connecting the compressed gas exit port to the conduit means directing the motive gas to the external thermal source for inhibiting backflow of motive gas passing the valve means.

4. The thermal engine of claim 3 comprising further a turbocompressor, wherein the turbocompressor has a compressor side connected to the conduit means for directing a motive gas to the intake port of the compressor side of the rotary engine component and a turbine side connected to the exit port of the expander side of the rotary engine component.

5. The thermal engine of claim 4 wherein the conduit means connecting the compressor side of the turbocompressor with the intake port of the rotary engine component includes an intercooler for cooling compressed motive gas from the turbocompressor before entering the compressor side of the rotary engine component.

6. The thermal engine of claim 2 comprising further, a central processor having electronic sensing means for sensing engine operating conditions and having electronic control means for controlling engine operation.

7. The thermal engine of claim 6 wherein the intake ports have slidable plugs electronically displaceable by the electronic control means to vary the effective volumetric displacement of the compressor side and expander side of the housing chamber of the rotary engine component.

8. The thermal engine of claim 3 wherein the one-way valve means is automotively operated by a compression spring.

9. The thermal engine of claim 1 comprising additional conduit means for directing a motive gas to the external thermal source wherein the gas is thermally heated, and from the thermal source to the other of the intake ports on the other side of the epitrochoidal chamber, comprising an additional expander side of the housing chamber, wherein the motive gas is expanded, rotating rotor before exiting from the exit port.

10. The thermal engine of claim 9 comprising further a turbocompressor, wherein the turbocompressor has a compressor side connected to both conduit means, and a turbine side connected to the exit ports.

11. The thermal engine of claim 9 comprising further a positive displacement rotary compressor component having an engine housing forming an epitrochoidal chamber;
- a piston rotor having an internal gear eccentrically contained in the epitrochoidal chamber and rotatable therein wherein the rotor and chamber are configured to effectively divide the chamber into sides, each side having an intake port and an exit port;
- a drive shaft rotationally mounted to the housing having means for mechanically engaging the eccentric rotor wherein rotation of the rotor in the housing rotates the drive shaft;
- means for interconnecting the compressor component component;
- means for selectively varying the intake ports for altering the effective displacement volume of each side of the epitrochoidal chamber on rotation of the rotor; and
- means connecting the exit ports of the compressor component to the conduit means for delivering compressed motive gas to the thermal source.

12. The thermal engine of claim 11 wherein the exit ports each have a one-way valve means for preventing back flow of exit gases.

13. The thermal engine of claim 12 in combination with a turbocompressor.

14. The thermal engine of claim 13 in combination with a central processor means for monitoring and controlling engine operation.

* * * * *